United States Patent
Bito

(10) Patent No.: US 9,140,227 B2
(45) Date of Patent: Sep. 22, 2015

(54) CONTROL DEVICE FOR VEHICLE

(75) Inventor: Seiji Bito, Shizuoka-ken (JP)

(73) Assignee: Suzuki Motor Corporation, Shizuoka-Ken (JP)

(*) Notice: Subject to any disclaimer, the term of this patent is extended or adjusted under 35 U.S.C. 154(b) by 435 days.

(21) Appl. No.: 13/553,241

(22) Filed: Jul. 19, 2012

(65) Prior Publication Data

US 2013/0085657 A1     Apr. 4, 2013

(30) Foreign Application Priority Data

Sep. 29, 2011   (JP) .................................. 2011-214922

(51) Int. Cl.
*F02N 11/08*     (2006.01)
*F02N 11/04*     (2006.01)

(52) U.S. Cl.
CPC ....... *F02N 11/0825* (2013.01); *F02N 2200/061* (2013.01); *Y02T 10/48* (2013.01)

(58) Field of Classification Search
None
See application file for complete search history.

(56) References Cited

U.S. PATENT DOCUMENTS

| | | | | |
|---|---|---|---|---|
| 6,532,926 | B1* | 3/2003 | Kuroda et al. | 123/179.4 |
| 6,895,917 | B2* | 5/2005 | Itoh et al. | 123/179.4 |
| 7,082,914 | B2* | 8/2006 | You | 123/179.4 |
| 7,383,119 | B2* | 6/2008 | Lewis | 701/112 |
| 2002/0017261 | A1* | 2/2002 | Kuroda et al. | 123/179.4 |
| 2006/0150937 | A1 | 7/2006 | Lupo et al. | |
| 2006/0289208 | A1* | 12/2006 | Katsuhiro et al. | 180/65.2 |
| 2007/0001647 | A1* | 1/2007 | D'Avanzo et al. | 320/132 |
| 2007/0018608 | A1 | 1/2007 | Okumura | |
| 2008/0258895 | A1 | 10/2008 | Yamaguchi | |
| 2009/0030595 | A1* | 1/2009 | Sugai | 701/112 |
| 2009/0241883 | A1* | 10/2009 | Nagoshi et al. | 123/179.4 |
| 2009/0314255 | A1* | 12/2009 | Boesch | 123/339.24 |
| 2010/0106351 | A1* | 4/2010 | Hanssen et al. | 701/22 |
| 2010/0269776 | A1* | 10/2010 | Mizuno | 123/179.4 |
| 2012/0153890 | A1 | 6/2012 | Takahashi et al. | |

FOREIGN PATENT DOCUMENTS

| | | |
|---|---|---|
| CN | 1800614 A | 7/2006 |
| CN | 1874912 A | 12/2006 |
| CN | 101291080 A | 10/2008 |
| JP | 06165309 A * | 6/1994 |

(Continued)

OTHER PUBLICATIONS

Office Action for Chinese Application No. 201210303736.7 dated Dec. 2, 2014.

(Continued)

*Primary Examiner* — Lindsay Low
*Assistant Examiner* — Brian P Monahon
(74) *Attorney, Agent, or Firm* — Alston & Bird LLP

(57) ABSTRACT

A control device for a vehicle including an engine stop and start device includes a battery and a vehicle speed detecting unit and includes a battery current detecting unit, a battery temperature detecting unit, a deceleration state detecting unit, a fuel supply stop unit, an average charging current calculating unit, and an SOC estimating unit. The control device calculates, with the average charging current calculating unit, an average of a battery current in a predetermined time from detection of a stop of fuel supply to an engine in a deceleration state of the vehicle. The control device permits a stop of the engine when an SOC calculated by the SOC estimating unit is larger than a predetermined value.

1 Claim, 2 Drawing Sheets

(56) References Cited

FOREIGN PATENT DOCUMENTS

| | | | |
|---|---|---|---|
| JP | 2001224103 A | * | 8/2001 |
| JP | 2003-035176 | | 2/2003 |
| JP | 2003 035176 A | | 2/2003 |
| JP | 2004-068675 A | | 3/2004 |
| JP | 2004-084484 A | | 3/2004 |
| JP | 2006-197739 A | | 7/2006 |
| JP | 2006-343230 A | | 12/2006 |
| JP | 2007-271424 A | | 10/2007 |
| JP | 2011-149345 A | | 8/2011 |
| JP | 2011-151983 A | | 8/2011 |
| WO | WO 2011 089786 A1 | | 7/2011 |

OTHER PUBLICATIONS

Office Action for Japanese Application No. 2011-214922 dated Mar. 2, 2015.

* cited by examiner

CONTROL DEVICE FOR VEHICLE

CROSS-REFERENCE TO RELATED APPLICATIONS

The present application claims priority to Japanese Patent Application No. 2011-214922, filed Sep. 29, 2011, which is incorporated herein in its entirety.

BACKGROUND OF THE INVENTION AND RELATED ART STATEMENT

1. Field of the Invention

The present invention relates to a control device for a vehicle including an engine stop and start device which automatically carries out a stop and a restart of an internal combustion engine of the vehicle mounted with the internal combustion engine and a regenerative charging device which charges a battery using energy during deceleration of the vehicle.

2. Description of Related Art

As a fuel efficiency improving technique for a vehicle mounted with an internal combustion engine, an idling stop system is known.

The idling stop system is also called engine stop and start device. The idling stop system automatically performs each of a temporary stop of the engine and a restart of the stopped engine.

In a control device for a vehicle including the engine stop and start device in the past, when the engine is restarted, for example, a starter motor is started to restart the engine.

In the restart, electric power of a battery for starting the starter motor is necessary.

If the electric power of the battery is not accumulated enough for starting the starter motor, the engine may not be able to be restarted. Therefore, it is necessary to always monitor an accumulation state of the electric power of the battery.

As a related art concerning the control device for a vehicle, there is a technique disclosed in Japanese Patent Application Laid-Open Publication No. 2003-35176. In Japanese Patent Application Laid-Open Publication No. 2003-31576, a balance of charging and discharging is calculated by cumulatively integrating charging and discharging capacities of a storage battery from an engine start or restart to the next engine restart during the idle stop-and-go driving and the balance is compared with a threshold set in advance. This makes it possible to determine a charging state without quantitatively calculating a set value of a battery capacity of the storage battery and surely perform an engine restart after an idling stop.

It is known that fuel injection is stopped when a vehicle is decelerated using an engine brake and the fuel injection stop can contribute to fuel saving. There is a method of driving, simultaneously with the deceleration of the vehicle, an alternator (a generator) using energy during the deceleration of the vehicle and regenerating the energy as electric power to charge a battery.

The engine stop and restart by the engine stop and start device may be enabled by the electric power obtained by the regeneration. Therefore, it is desirable that the engine can be stopped as much as possible taking into account a charging amount of the battery by the regeneration.

OBJECT AND SUMMARY OF THE INVENTION

An object of the present invention is to provide a control device for a vehicle which can not only determine, from a charging state of a battery during deceleration of the vehicle and a stop of fuel supply, whether a stop and a restart of an engine can be carried out and carry out the stop and the restart but also calculate an engine stoppable time from the charging state of the battery and perform a stop of the engine corresponding to the charging state of the battery.

Therefore, to solve the inconveniences, the present invention provides a control device for a vehicle including an engine stop and start device configured to perform an automatic stop and a restart of an engine, which is a power source for the vehicle. The control device includes a battery configured to supply electric power to the engine stop and start device and a vehicle speed detecting unit configured to detect the speed of the vehicle. The control device includes a battery current detecting unit configured to detect an electric current of the battery, a battery temperature detecting unit configured to detect the temperature of the battery, a deceleration state detecting unit configured to detect a deceleration state of the vehicle, a fuel supply stop unit configured to stop fuel supply to the engine when the deceleration state detecting unit detects that the vehicle is in the deceleration state, an average charging current calculating unit configured to calculate an average of a battery current detected by the battery current detecting unit, and an SOC estimating unit configured to estimate an SOC of the battery from an average charging current and calculate an estimated SOC. The control device calculates, with the average charging current calculating unit, an average of a battery current in a predetermined time from detection of a stop of the fuel supply to the engine in the deceleration state of the vehicle. The control device permits a stop of the engine when the SOC calculated by the SOC estimating unit is larger than a predetermined value.

As explained above in detail, according to the present invention, it is possible to estimate an SOC of the battery from a charging current obtained when charging of the battery is performed using energy during deceleration of the vehicle, determine whether an automatic stop and a restart of the engine can be carried out, and carry out the automatic stop and the restart of the engine.

DETAILED DESCRIPTION OF PREFERRED EMBODIMENTS

An embodiment of the present invention is explained in detail below based on the drawings.

Figure 1:
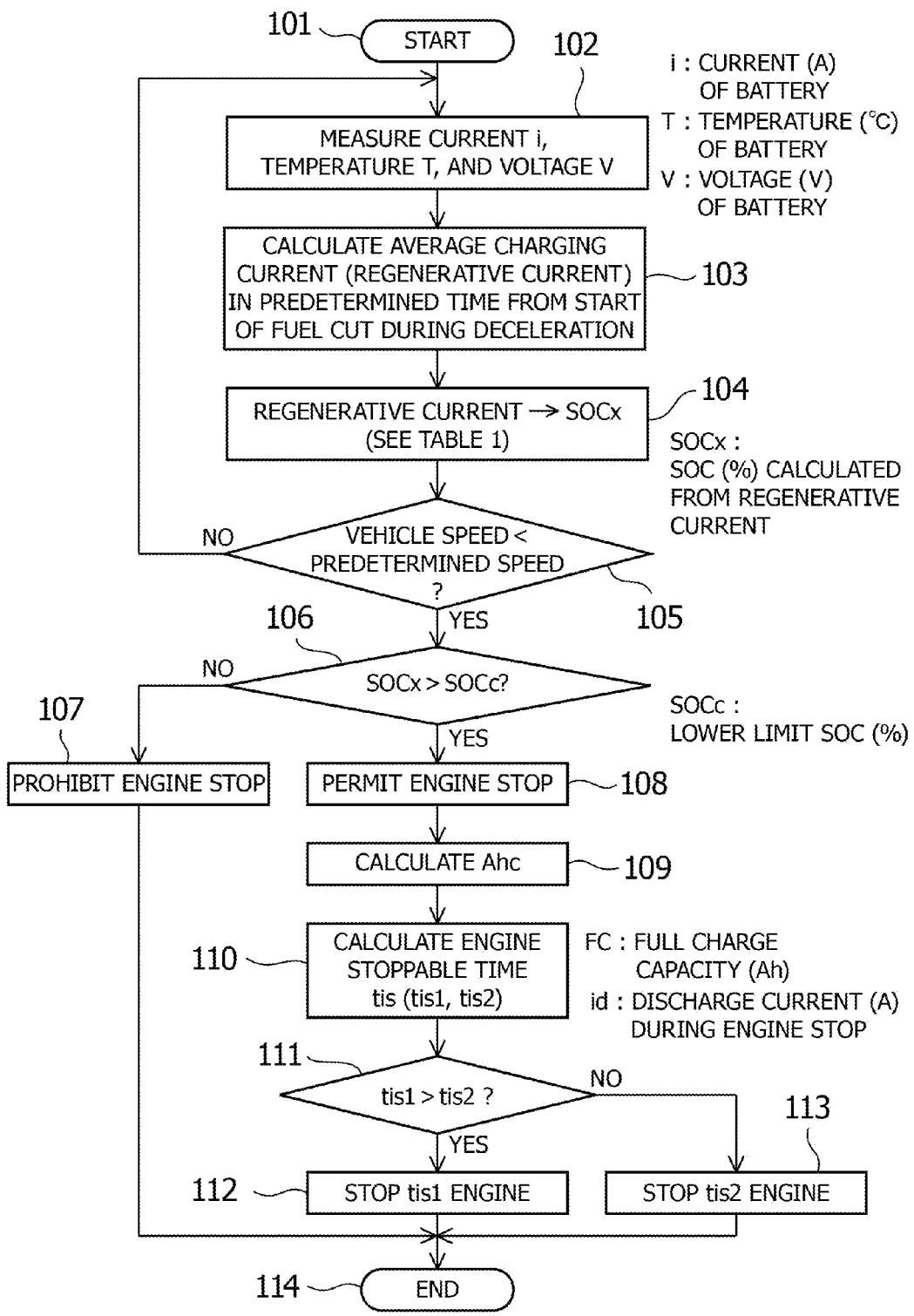
FIG. 1 is a control flowchart of a control device for a vehicle according to an embodiment.
Figure 2:
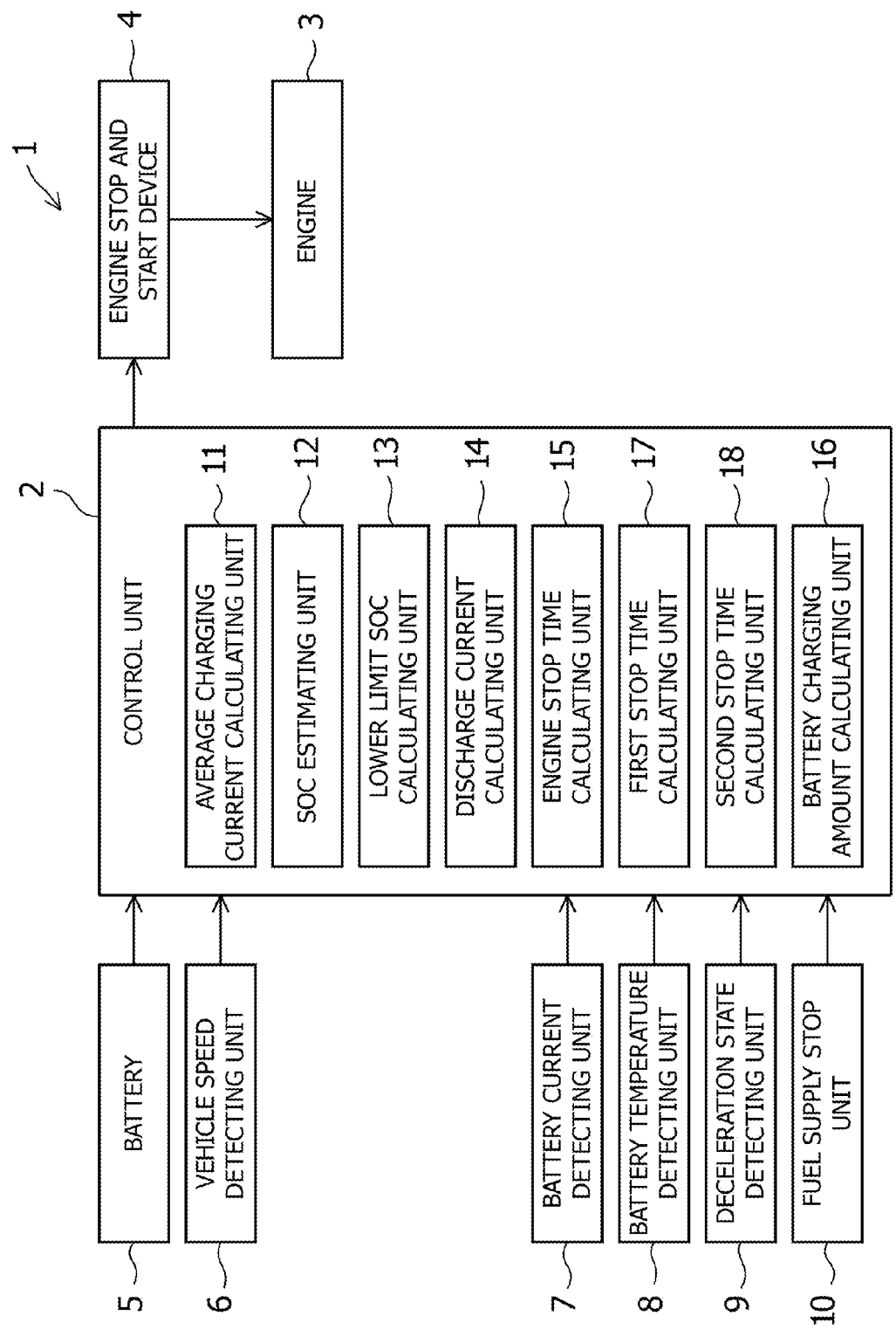
FIG. 2 is a schematic block diagram of the control device for a vehicle according to the embodiment.

FIGS. 1 and 2 show the embodiment of the present invention.

In FIG. 2, reference numeral 1 denotes a control device for a vehicle and 2 denotes a control unit which performs arithmetic processing and the like of the control device 1.

Specifically, the control device 1 for the vehicle includes, as shown in FIG. 2, an engine stop and start device 4 which performs an automatic stop and a restart of an engine 3, which is a power source for the vehicle, connected to the control unit 2.

The control device 1 includes a battery 5 which supplies electric power to the engine stop and start device 4 and a vehicle speed detecting unit 6 which detects the speed of the vehicle.

Further, the control device 1 includes a battery current detecting unit 7, a battery temperature detecting unit 8, a deceleration state detecting unit 9, a fuel supply stop unit 10, an average charging current calculating unit 11, and an SOC estimating unit 12.

The battery current detecting unit 7 detects an electric current of the battery 5.

The battery temperature detecting unit 8 detects the temperature of the battery 5.

The deceleration state detecting unit 9 detects a deceleration state of the vehicle.

The fuel supply stop unit 10 stops fuel supply to the engine 3 when the deceleration state detecting unit 9 detects that the vehicle is in the deceleration state.

The average charging current calculating unit 11 calculates an average of a battery current detected by the battery current detecting unit 7.

The SOC estimating unit 12 estimates an SOC of the battery 5 from an average charging current and calculates an estimated SOC.

The control device 1 calculates, with the average charging current calculating unit 11, an average of a battery current in a predetermined time from detection of a stop of the fuel supply to the engine 3 in the deceleration state of the vehicle. The control device 1 permits a stop of the engine 3 when the SOC calculated by the SOC estimating unit 12 is larger than a predetermined value.

Specifically, the control unit 2 of the control device 1 detects the deceleration state of the vehicle with the deceleration state detecting unit 9. When the vehicle is in the deceleration state and the deceleration state detecting unit 9 detects that the vehicle is in the deceleration state, the control unit 2 detects, with the battery current detecting unit 7, an electric current i of the battery 5 for a predetermined time from a stop of the fuel supply to the engine 3 (fuel cut) by the fuel supply stop unit 10, for example, for three seconds.

The control unit 2 calculates, with the average charging current calculating unit 11, an average (also referred to as "average charging current" or "regenerative current") of the electric current i of the battery 5 detected by the battery current detecting unit 7.

In calculating an SOC with the SOC estimating unit 12, control unit 2 calculates an SOCx, which is an SOC, from a regenerative current according to Table 1 below, compares the SOCx and a predetermined value SOCc (also referred to as "lower limit SOC (predetermined value)" explained below), and permits a stop of the engine when the SOCx is larger than the predetermined value SOCc.

Note that the SOC is an abbreviation of "State of Charge" and is a value indicating a ratio of a charging capacity to a rated capacity of a battery.

A unit used for the SOC is "%".

TABLE 1

Regenerative current and SOC

|  |  | SOC (%) | | | | |
| --- | --- | --- | --- | --- | --- | --- |
|  | Regenerative current (A) | 20 | 40 | 60 | 80 | 100 |
| Battery temperature (° C.) | 50 or higher | 168 | 144 | 120 | 96 | 0 |
|  | 25 | 140 | 120 | 100 | 80 | 0 |
|  | 15 | 112 | 96 | 80 | 64 | 0 |
|  | 0 or lower | 56 | 48 | 40 | 32 | 0 |

Values of Table 1 are an example.

Consequently, it is possible to estimate an SOC of the battery 5 from a charging current obtained when the charging of the battery is performed using energy during deceleration of the vehicle, determine whether an automatic stop and a restart of the engine 3 can be carried out, and carry out the automatic stop and the restart.

The control device 1 includes, as shown in FIG. 2, a lower limit SOC calculating unit 13, a discharge current calculating unit 14, an engine stop time calculating unit 15, and a battery charging amount calculating unit 16.

The lower limit SOC calculating unit 13 calculates a lower limit SOC, which is the predetermined value SOCc with which the restart after the automatic stop of the engine 3 can be carried out at least once.

The discharge current calculating unit 14 calculates a discharge current of the battery 5 during the automatic stop of the engine 3.

The engine stop time calculating unit 15 calculates an engine stoppable time from the automatic stop to the restart of the engine 3.

The battery charging amount calculating unit 16 calculates a charging amount for the battery 5 from a charging current and time from a stop of the fuel supply to the engine 3 in the deceleration state of the vehicle until a stop of the vehicle.

The engine stop time calculating unit 15 includes, as shown in FIG. 2, a first stop time calculating unit 17 which calculates a first stop time tis1, which is an engine stop time, from a difference between the estimated SOC and the lower limit SOC and the discharge current and a second stop time calculating unit 18 which calculates a second stop time tis2, which is an engine stop time, from the charging amount calculated by the battery charging amount calculating unit 16 and the discharge current.

In selecting an engine stop time, the control device 1 selects, as the engine stop time, larger one of the first stop time tis1 calculated by the first stop time calculating unit 17 and the second stop time tis2 calculated by the second stop time calculating unit 18.

Specifically, the first stop time calculating unit 17 calculates the first stop time tis1 according to the following equation:

$$tis1 = (SOCx - SOCc) \times Fc/id$$

where, tis1 is the first engine stop time (unit: t), SOCx is the SOC (unit: %) calculated from the regenerative current, SOCc is the lower limit SOC (unit: %), which is the predetermined value, Fc is a full charge capacity (a predetermined value) (unit: Ah) (Ah is a product of time and an electric current), and id is a discharge current (unit: A) during engine stop (id is calculated during the engine stop but may be calculated from a map calculated beforehand).

The second stop time calculating unit 18 calculates the second stop time tis2 according to the following equation:

$$tis2 = Ahc/id$$

where, tis2 is the second engine stop time (unit: t) and Ahc is an charged electricity amount (unit: Ah) obtained until a vehicle stop during deceleration and during fuel cut (fuel supply stop).

The control device 1 compares the first stop time tis1 calculated by the first stop time calculating unit 17 and the second stop time tis2 calculated by the second stop time calculating unit 18 and selects larger one of the first stop time tis1 and the second stop time tis2 as the engine stop time.

Consequently, it is possible to calculate a stoppable time of the engine 3 from the charging current obtained when the charging of the battery 5 is performed using the energy during deceleration of the vehicle.

The control device 1 includes plural units which calculate stoppable times of the engine 3 from the charging current. The control device 1 can stop the engine 3 adopting larger one of the calculated plural engine stoppable times, perform the engine stop longer, and further save the fuel.

The SOC estimation and the determination of an engine stop time performed when the battery 5 is regenerated and charged by an alternator (not shown) during deceleration are explained (see FIG. 1).

First, the control device 1 detects the electric current i of the battery 5 with the battery current detecting unit 7 and detects temperature T of the battery 5 with the battery temperature detecting unit 8. On the other hand, the control device 1 starts measurement of a voltage V of the battery 5.

The control device 1 detects a deceleration state of the vehicle with the deceleration state detecting unit 9. When the deceleration state detecting unit 9 detects that the vehicle is in the deceleration state, the control device 1 calculates, with the average charging current calculating unit 11, an average of a battery current, which is an average charting current in a predetermined time (e.g., three seconds) from the start of a stop of the fuel supply to the engine 3 by the fuel supply stop unit 10.

The control device 1 invalidates regeneration for time shorter than the predetermined time, i.e., three seconds.

After calculating the average of the battery current, the control device 1 estimates an SOCx of an estimated SOC from a relation between the average charting current for three seconds and the SOC according to Table 1.

When the vehicle speed detecting unit 6 detects the speed of the vehicle, if the vehicle speed drops to predetermined speed (e.g., 3 km/h), the control device 1 carries out, assuming that the vehicle stops, determination for determining whether an idling stop is possible.

The control device 1 further includes the average charging current calculating unit 11 which calculates an average of the battery current detected by the battery current detecting unit 7 and the SOC estimating unit 12 which estimates an SOC of the battery 5 from an average charging current and calculates an estimated SOC.

If the SOCx, which is an SOC calculated from the regenerative current, is larger than the lower limit SOC, which is the predetermined value SOCc, the control device 1 shifts to permitting engine stop. If the SOCx is equal to or smaller than the lower limit SOC, which is the predetermined SOCc, the control device 1 returns to the measurement.

Thereafter, the control device 1 calculates the charged electricity amount Ahc obtained until a vehicle stop (vehicle speed 0 km/h) during deceleration and during fuel cut.

After calculating the charged electricity amount Ahc, the control device 1 performs the engine stop at the first stop time tis1 calculated by the first stop time calculating unit 17 from a deviation between the SOCx and the lower limit SOC, which is the predetermined value SOCc, or the second stop time tis2 calculated by the second stop time calculating unit 18 from the charged electricity amount Ahc.

As an engine stoppable time tis in carrying out the engine stop, the control device 1 adopts larger one of the first stop time tis1 and the second stop time tis2.

Action is explained according to a control flowchart of the control device 1 shown in FIG. 1.

When a control program of the control device 1 starts (101), the control device 1 detects the electric current i (unit: A) of the battery 5 with the battery current detecting unit 7 and detects the temperature T (unit: ° C.) of the battery 5 with the battery temperature detecting unit 8. On the other hand, the control device 1 shifts to processing (102) for measuring the voltage V (unit: V) of the battery 5.

The control unit 2 of the control device 1 detects a deceleration state of the vehicle with the deceleration state detecting unit 9. When the vehicle is in the deceleration state and the deceleration state detecting unit 9 detects that the vehicle is in the deceleration state, the control unit 2 detects the electric current i of the battery 5 with the battery current detecting unit 7 for a predetermined time, for example, three seconds from the stop of the fuel supply to the engine 3 by the fuel supply stop unit 10.

After the processing (102) for measuring the electric current i, the temperature T, and the voltage V of the battery 5, the control device 1 shifts to processing (103) for calculating, with the average charging current calculating unit 11, an average (also referred to as "average charging current" or "regenerative current") of the electric current i of the battery 5 detected by the battery current detecting unit 7.

After the processing (103) for calculating an average (also referred to as "average charging current" or "regenerative current") of the electric current i of the battery 5, the control device 1 shifts to processing (104) for calculating the SOCx, which is an SOC calculated from the regenerative current, with the SOC estimating unit 12 from Table 1 using the average (also referred to as "average charging current" or "regenerative current") of the electric current i of the battery 5.

After the processing (104) for calculating the SOCx, the control device 1 shifts to determination (105) for determining whether the vehicle speed detected by the vehicle speed detecting unit 6 is lower than predetermined speed (e.g., 3 km/h).

If it is determined in the determination (105) that the vehicle speed is not lower than the predetermined speed (NO in 105), the control device 1 returns to the processing (102) for measuring the electric current i, the temperature T, and the voltage V of the battery 5.

If it is determined in the determination (105) that the vehicle speed is lower than the predetermined speed (YES in 105), the control device 1 shifts to determination (106) for determining whether the SOCx, which is the SOC calculated from the regenerative current in the processing (104), exceeds the predetermined value SOCc (hereinafter also referred to as "lower limit SOC (predetermined value)").

If it is determined in the determination (106) that the SOCx does not exceed the predetermined value SOCc (YES in 106), the control device 1 shifts to processing (107) for prohibiting an engine stop. Thereafter, the control device 1 shifts to an end (114) of the control program of the control device 1 explained below.

If it is determined in the determination (106) that the SOCx exceeds the predetermined value SOCc (NO in 106), the control device 1 shifts to processing (108) for permitting the engine stop. The control device 1 shifts to processing (109) for calculating the charged electricity amount Ahc until a vehicle stop (vehicle speed 0 km/h) during deceleration and during fuel cut.

After the processing (109) for calculating the charged electricity amount Ahc, the control device 1 shifts to processing (110) for calculating the engine stoppable time tis.

In the processing (110) for calculating the engine stoppable time tis, the first stop time calculating unit 17 calculates the first stop time tis 1 according to the following equation:

$$tis1 = (SOCx - SOCc) \times Fc/id$$

On the other hand, the second stop time calculating unit 18 calculates the second stop time tis2 according to the following equation:

$$tis2 = Ahc/id$$

The control device 1 shifts to determination (111) for determining whether the first stop time tis1 calculated by the first stop time calculating unit 17 exceeds the second stop time tis2 calculated by the second stop time calculating unit 18.

If it is determined in the determination (111) that the first stop time tis1 exceeds the second stop time tis2 (YES in 111), the control device 1 adopts, as the engine stoppable time tis, the first stop time tis1 calculated by the first stop time calculating unit 17. The control device 1 shifts to processing (112) for performing an engine stop. Thereafter, the control device 1 shifts to the end (114) of the control program of the control device 1.

If it is determined in the determination (111) that the first stop time tis1 does not exceed the second stop time tis2 (NO in 111), the control device 1 adopts, as the engine stoppable time tis, the second stop time tis2 calculated by the second stop time calculating unit 18. The control device 1 shifts to processing (113) for performing an engine stop. Thereafter, the control device 1 shifts to the end (114) of the control program of the control device 1.

The present invention is not limited to the embodiment. Various applied modifications of the embodiment are possible.

For example, in the embodiment of the present invention, the present invention is explained as being simply applied to the vehicle. However, the present invention can also be applied to, for example, a motor car which uses electricity as a driving source.

REFERENCE SIGNS LIST 1 control device for a vehicle
2 control unit
3 engine
4 engine stop and start device
5 battery
6 vehicle speed detecting unit
7 battery current detecting unit
8 battery temperature detecting unit
9 deceleration state detecting unit
10 fuel supply stop unit
11 average charging current calculating unit
12 SOC estimating unit
13 lower limit SOC calculating unit
14 discharge current calculating unit
15 engine stop time calculating unit
16 battery charging amount calculating unit
17 first stop time calculating unit
19 second stop time calculating unit

What is claimed is:

1. A control device for a vehicle comprising:
an engine stop and start device configured to perform an automatic stop and a restart of an engine, which is a power source for the vehicle;
a battery configured to supply electric power to the engine stop and start device;
a vehicle speed detecting unit configured to detect speed of the vehicle;
a battery current detecting unit configured to detect an electric current of the battery;
a battery temperature detecting unit configured to detect temperature of the battery;
a deceleration state detecting unit configured to detect a deceleration state of the vehicle;
a fuel supply stop unit configured to stop fuel supply to the engine when the deceleration state detecting unit detects that the vehicle is in the deceleration state;
an average charging current calculating unit configured to calculate an average of a battery current detected by the battery current detecting unit;
an SOC estimating unit configured to estimate an SOC of the battery from an average charging current and calculate an estimated SOC;
a lower limit SOC calculating unit configured to calculate a lower limit SOC with which the restart after the automatic stop of the engine can be carried out at least once;
a discharge current calculating unit configured to calculate a discharge current of the battery during the automatic stop of the engine;
an engine stop time calculating unit configured to calculate an engine stoppable time from the automatic stop to the restart of the engine; and
a battery charging amount calculating unit configured to calculate a charging amount for the battery from a charging current and time from a stop of the fuel supply to the engine in the deceleration state of the vehicle until a stop of the vehicle, wherein:
the control device calculates, with the average charging current calculating unit, an average of a battery current in a predetermined time after detection of a stop of the fuel supply to the engine in the deceleration state of the vehicle and permits a stop of the engine when the SOC calculated by the SOC estimating unit is larger than a predetermined value; and
the engine stop time calculating unit includes:
a first stop time calculating unit configured to calculate an engine stop time from a difference between the estimated SOC and the lower limit SOC and the discharge current; and
a second stop time calculating unit configured to calculate an engine stop time from the charging amount calculated by the battery charging amount calculating unit and the discharge current, and
the control device selects, as the engine stop time, larger one of the engine stop time calculated by the first stop time calculating unit and the engine stop time calculated by the second stop time calculating unit.

* * * * *